(12) United States Patent
Dhindsa et al.

(10) Patent No.: US 12,341,771 B2
(45) Date of Patent: *Jun. 24, 2025

(54) CONTEXT-BASED AUTHENTICATION OF A USER

(71) Applicant: Capital One Services, LLC, McLean, VA (US)

(72) Inventors: Amanpreet Kaur Dhindsa, Aldie, VA (US); Jayanth Prathipati, Aldie, VA (US); Hamza Monawer, Burke, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,020

(22) Filed: Feb. 12, 2024

(65) Prior Publication Data

US 2024/0187406 A1    Jun. 6, 2024

Related U.S. Application Data

(63) Continuation of application No. 17/248,140, filed on Jan. 11, 2021, now Pat. No. 11,902,275.

(51) Int. Cl.
*H04L 9/40* (2022.01)
*G06F 21/32* (2013.01)
(Continued)

(52) U.S. Cl.
CPC .......... *H04L 63/0853* (2013.01); *G06F 21/32* (2013.01); *G06F 21/34* (2013.01); *G06Q 20/401* (2013.01); *G06Q 20/42* (2013.01); *G06Q 40/02* (2013.01); *H04L 63/0861* (2013.01); *H04L 67/60* (2022.05); *G06F 2221/2103* (2013.01);
(Continued)

(58) Field of Classification Search
CPC ............. H04L 63/0853; H04L 63/0861; H04L 2463/082; G06Q 20/401; G06Q 20/42
See application file for complete search history.

(56) References Cited

U.S. PATENT DOCUMENTS 7,110,959 B2   9/2006   Hahn-Carlson
7,739,744 B2   6/2010   Burch et al.
(Continued)

OTHER PUBLICATIONS

Hayashi V., et al., "Non-Invasive Challenge Response Authentication for Voice Transactions with Smart Home Behavior Sensors," Nov. 2020, vol. 20(22). pp. 6563.

*Primary Examiner* — David J Pearson
(74) *Attorney, Agent, or Firm* — Harrity & Harrity, LLP

(57) ABSTRACT

In some implementations, a device may receive a notification to authenticate a user associated with a user account of an application server. The device may send, to the user device, an authentication request that prompts the user to provide a contextual description of an operation associated with the user account. The device may receive, from the user device, an authentication response that includes a described characteristic of the operation that is associated with a parameter of the operation. The device may determine whether the authentication response is valid based on a comparison of the described characteristic of the operation and the parameter of the operation. The device may cause, based on a determination that the authentication response is valid, performance of the operation based on the parameter.

20 Claims, 7 Drawing Sheets

(51) Int. Cl.
*G06F 21/34* (2013.01)
*G06Q 20/40* (2012.01)
*G06Q 20/42* (2012.01)
*G06Q 40/02* (2023.01)
*H04L 67/60* (2022.01)

(52) U.S. Cl.
CPC ............... *G06F 2221/2113* (2013.01); *H04L 2463/082* (2013.01)

(56) References Cited

U.S. PATENT DOCUMENTS

| | | |
|---|---|---|
| 8,041,030 B2 | 10/2011 | Somers et al. |
| 9,208,302 B2 | 12/2015 | Kannavara et al. |
| 9,275,228 B2 | 3/2016 | Niemela et al. |
| 9,906,519 B1 | 2/2018 | Kotamraju |
| 10,200,364 B1 | 2/2019 | Ketharaju et al. |
| 10,755,281 B1 | 8/2020 | Yip et al. |
| 10,972,458 B1 | 4/2021 | Gaeta et al. |
| 10,979,423 B1 | 4/2021 | Garner, IV et al. |
| 11,902,275 B2 * | 2/2024 | Dhindsa ............... H04W 12/08 |
| 2007/0136573 A1 | 6/2007 | Steinberg |
| 2012/0030108 A1 | 2/2012 | Katina |
| 2013/0282589 A1 | 10/2013 | Shoup et al. |
| 2019/0147155 A1 | 5/2019 | Di Luzio et al. |
| 2019/0236254 A1 | 8/2019 | Ballard et al. |
| 2019/0289000 A1 | 9/2019 | Kao |
| 2019/0327237 A1 | 10/2019 | Bar et al. |
| 2020/0169552 A1 | 5/2020 | Siddiqui et al. |
| 2021/0304017 A1 | 9/2021 | Stahlhut et al. |
| 2021/0374740 A1 | 12/2021 | Oosthuizen et al. |

* cited by examiner

CONTEXT-BASED AUTHENTICATION OF A USER

RELATED APPLICATION

This application is a continuation of U.S. patent application Ser. No. 17/248,140, filed Jan. 11, 2021 (now U.S. Pat. No. 11,902,275), which is incorporated herein by reference in its entirety.

BACKGROUND

In information security, authentication refers to techniques used to prove or otherwise verify an assertion, such as the identity of a user. For example, in some cases, authentication may be performed using biometrics, which generally include body measurements and/or calculations that relate to distinctive, measurable human characteristics. Biometric traits that are used for authentication are typically universal (e.g., every person possesses the trait), unique (e.g., the trait is sufficiently different to distinguish different individuals), and/or permanent (e.g., the trait does not significantly vary over time). Accordingly, because a biometric identifier is unique to a specific individual, biometrics can provide a more reliable and secure mechanism to verify a user identity and determine whether to grant the user access to systems, devices, and/or data relative to passwords and/or security tokens that may be lost, forgotten, or otherwise compromised (e.g., stolen or guessed by a malicious user).

SUMMARY

In some implementations, a system for authenticating a user includes one or more memories; and one or more processors, communicatively coupled to the one or more memories, configured to: receive a session input associated with a user account of an application server, wherein the session input is associated with requesting performance of an operation of the application server; determine, based on the session input, that a context-based authentication of a user is to be obtained prior to performing the operation; send, to a user device associated with the user, an authentication request that the user provide a contextual description of the operation; receive, from the user device, an authentication response; process, using a natural language processing model, the authentication response to identify a described characteristic of the operation; compare the described characteristic with a corresponding parameter of the operation; determine that the authentication response is valid based on comparing the described characteristic of the operation with the corresponding parameter of the operation; and perform, based on determining that the authentication response is valid, the operation according to the session input.

In some implementations, a method for authenticating a user includes receiving a notification to authenticate a user associated with a user account of an application server, wherein the notification includes an account identifier of the user account and a parameter of an operation of the application server; identifying, based on the account identifier, a plurality of user devices that are associated with the user; selecting, based on a type of the operation, a user device from the plurality of user devices to be used to authenticate the user; sending, to the user device, an authentication request that prompts the user to provide a contextual description of the operation; receiving, from the user device, an authentication response that includes a described characteristic of the operation that is associated with the parameter; determining whether the authentication response is valid based on a comparison of the described characteristic of the operation and the parameter of the operation; and causing, based on a determination that the authentication response is valid, performance of the operation based on the parameter.

In some implementations, a non-transitory computer-readable medium storing a set of instructions includes one or more instructions that, when executed by one or more processors of a system, cause the system to: receive a notification to authenticate a user associated with a user account of an application server, wherein the notification includes an account identifier of the user account and a parameter of an operation of the application server; send, based on receiving the notification, an authentication request to a user device associated with the user, wherein the authentication request includes a message indicating that the user is to provide a contextual description of the operation; receive, from the user device, an authentication response that includes a described characteristic of the operation; authenticate the user based on a comparison of the described characteristic of the operation and a parameter of the operation; and cause, based on authenticating the user, performance of the operation.

DETAILED DESCRIPTION

Figure 1A:
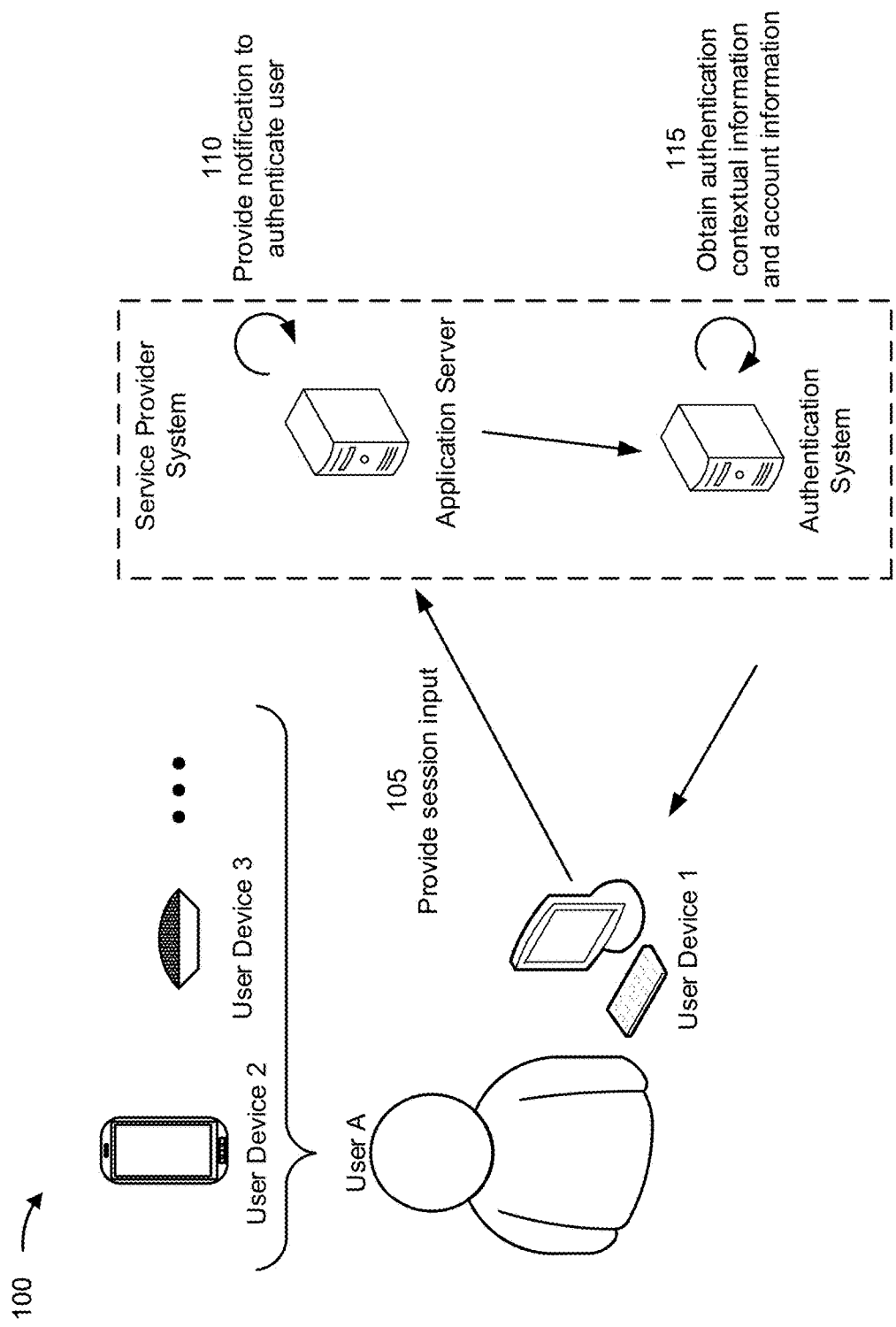
FIGS. 1A-1D are diagrams of an example implementation relating to context-based authentication of a user.

The following detailed description of example implementations refers to the accompanying drawings. The same reference numbers in different drawings may identify the same or similar elements.

Multi-factor authentication (MFA) is an authentication technique in which a user of a user device is granted access to a resource (e.g., an application, a service of an application, and/or a computing resource) only after successfully presenting two or more factors to an authentication service. In some instances, a primary factor (first factor) for MFA involves a user credential (e.g., username and password combination) that is provided to the user device to access the resource. A secondary factor can be generated by the authentication service and provided to the user via the user device within a message (e.g., a text message, an email, and/or a voice call). For example, the secondary factor may include a code (e.g., a one-time passcode (OTP) or other type of temporary and/or unique number or phrase) that is provided to the user device to permit the authentication service to authenticate the user via a response that includes the unique code. However, such a message is susceptible to being sent to a wrong user (or malicious actor), susceptible to being hacked, and/or susceptible to being intercepted by malware and/or malicious actors, which can then fraudulently gain access to the resource by providing the second factor.

Other secondary factors for MFA may include other types of user-specific information that can be provided in a response from a user, such as unique knowledge (e.g., something only the user knows), unique possession (e.g., something only the user has), and/or inherence (e.g., something only the user is), among other examples. For example, such user-specific information may include identification information of the user (e.g., a name, date of birth, and/or home address) and/or may be provided as answers to security questions used by the authentication service. However, such user-specific information may be readily available to other individuals and/or messages providing the user-specific information are also similarly susceptible to being hacked and/or stolen by malware and/or malicious actors.

Some implementations described herein provide a system that performs MFA using information that is learned and/or identified by an authentication system based on activity of a user session, thereby reducing or preventing malware or malicious actors from intercepting the information. For example, the system may utilize contextual information associated with a user session to authenticate a user. More specifically, the system may identify one or more parameters of an operation that is requested (e.g., by a user) during a user session and/or that is to be performed by an application server and send an authentication request to a user device associated with the user that requests the user to provide a contextual description of the operation. The system may process a response to the authentication request received from the user device that includes the contextual description of the operation and authenticate the user based on a comparison of described characteristics identified in the contextual description and the one or more parameters. In this way, the system may identify unique characteristics that are relatively more likely to be known to only a user performing an action and less likely to be known to malicious actors and/or susceptible to malware (e.g., because the user is engaged in the user session).

In some implementations, the system may request that an authentication response be provided as a media-based response that includes an audio message and/or a video message from a user of the user device. In some implementations, the media-based response can be processed using a media-based biometric analysis model (e.g., a voice recognition model and/or a facial recognition model) that is configured to authenticate that the media-based response was provided by an authorized user (e.g., using a reference signature associated with the authorized user's voice and/or the authorized user's face). In this way, the media-based response can be used to verify that an authorized user of the account is engaged in the user session and/or requesting operations of the application server.

Accordingly, the system described herein can improve security with respect to MFA of a user by identifying one or more unique and secure factors that are more likely to only be available to a user as compared to other types of factors used in MFA. Accordingly, some implementations described herein may reduce and/or prevent fraudulent activity involving a user's account that may result from malware and/or a malicious actor obtaining an authentication code while the user is engaged in a user session with an application server. Therefore, the system, as described herein, may conserve computing resources (e.g., processing resources, memory resources, and/or power resources) and/or network resources involved in correcting any fraudulent activity that would have been allowed without the use of the system as described herein. Furthermore, the system may conserve computing resources (e.g., processing resources and/or memory resources) associated with receiving and/or storing preconfigured and/or static user-specific information that is used in MFA by using learned and/or identified contextual information associated with a user session.

FIGS. 1A-1D are diagrams of an example implementation 100 associated with context-based authentication of a user. As shown in FIGS. 1A-1D, example implementation 100 includes multiple user devices associated with a user (User A) and a service provider system that includes an application server and an authentication system. As shown, the multiple user devices include a first user device (User Device 1), which may be a computer, a second user device (User Device 2), which may be a mobile device (e.g., a smartphone and/or tablet computer), and a third user device (User Device 3), which may be a home assistant device (e.g., a smart home controller and/or other type of Internet of Things (IoT) device). These devices are described in more detail below in connection with FIG. 2 and FIG. 3.

In some implementations, described herein, the service provider system may be associated with and/or correspond to an account management platform that is configured to manage one or more user accounts for one or more users. For example, the account management platform may manage transaction accounts (e.g., financial transaction accounts, data transaction accounts, and/or security transaction accounts), data management accounts (e.g., accounts for managing records, files, documents, media, and/or other data associated with a user), and/or social media accounts, among other examples. More specifically, the service provider system may use an application associated with the application server to receive, generate, process, store, and/or provide information associated with user accounts. The application (and/or corresponding instances of the application) may be installed and/or executed on one or more of the user devices in example 100. Additionally, or alternatively, the service provider system may use the authentication system to authenticate users associated with the managed user accounts.

In examples described herein, User A may correspond to an authorized user (e.g., a registered user, subscribed to receive one or more services of the service provider platform, and/or an associate of the registered user, such as a spouse or a relative) of a user account that is managed by the service provider system. While some examples described herein may specifically involve a transaction account (e.g., associated with User A), such as a transaction account associated with a financial institution (e.g., a banking institution, a credit union, and/or a brokerage organization), other examples may similarly apply to other types of user accounts, organizations, applications, and/or entities.

As shown in FIG. 1A, and by reference number 105, a user device (User Device 1) provides a session input to the application server. The session input may be associated with requesting performance of an operation of the application server. For example, the session input may include and/or be associated with a user input from User A that is received via an application (e.g., an account management application, a browser, and/or an online portal) that is executing on the User Device 1. The session input and/or the user input may include and/or be associated with a request, instructions, a message, and/or other type of communication that is provided from User Device 1 to the application server.

As an example, the session input may include a request or an instruction to perform an operation associated with a service provided via the application and/or the application server. For example, for a transaction account managed by the service provider system, the session input may include a request and/or instructions to cause the application server to perform and/or execute a transaction (e.g., a payment, a purchase, a withdrawal of funds, a deposit of funds, and/or a transfer of funds) involving the transaction account. Additionally, or alternatively, the operation may involve updating settings of the transaction account, updating personal information associated with User A that is managed and/or stored by the transaction account, accessing account information managed by the transaction account, and/or any other type of operation or service provided via the application and/or the application server.

The session input may include one or more variables that identify and/or correspond to parameters of the operation. For execution of a transaction between User A and a merchant, a variable and/or a parameter may include and/or identify a value of the transaction (e.g., an amount of funds), a merchant associated with the transaction (e.g., a merchant receiving a payment from User A and/or a merchant returning funds to User A), a type of the transaction (e.g., a deposit of funds, a withdrawal of funds, and/or a transfer of funds), a transaction device associated with the transaction (e.g., a transaction card used to perform the transaction and/or a user device used to perform the transaction), and/or an identifier or type of the transaction account (e.g., a checking account, a credit account, an investment account, and/or a savings account). Accordingly, based on the receiving the session input, the application server may be configured to perform the operation according to the one or more parameters that are included and/or identified within the session input.

As further shown in FIG. 1A, and by reference number 110, the application server provides, to the authentication system, a notification to authenticate the user. The application server may provide the notification to the authentication system based on the session input and/or other user activity associated with the user session. For example, the application server may determine whether User A is to be authenticated based on a parameter of an operation that is to be performed in association with the user account. In example implementation 100, the application server may determine that User A is to be authenticated based on a security level associated with the session input and/or a variable of the session input. For example, the application may determine the security level using settings of the transaction account (e.g., authentication settings provided by User A) and/or using security level mapping (e.g., a data structure that maps variables of the session input to corresponding security levels and/or that maps parameters of operations to corresponding security levels).

The security level may indicate whether or not User A is to be authenticated. For example, a lowest security level may be associated with certain operations that may not require MFA of User A. Such operations may include navigation operations through the application and/or accessing certain features of the application (e.g., accessing a transaction log of a transaction account) that do not require secure access. Additionally, or alternatively, the security level may indicate a particular type of authentication process that is to be utilized to authenticate the user. For example, for an operation associated with a relatively high security level, the application server may determine that a more secure authentication process (e.g., an authentication process that utilizes a relatively more complex factor of an MFA process) is to be utilized to authenticate User A. More specifically, the application server may determine that the security level satisfies a threshold level associated with requiring a context-based authentication process and/or media-based authentication process, as described elsewhere herein. In this way, the service provider system can enhance the security of the user account by requiring higher security thresholds to be met to perform operations that have a relatively greater impact on the user account (and/or the user).

In some implementations, for an operation associated with a relatively low security level (e.g., a security level that does not satisfy a threshold level associated with requiring a context-based authentication process and/or media-based authentication process), the application server may determine that a less secure authentication process (e.g., an OTP-based authentication process) may be utilized to authenticate User A. In such a case, the application server may select the less secure authentication process to conserve computing resources and/or network resources that would otherwise by consumed by the more secure authentication processes described elsewhere herein (e.g., due to the relatively higher amount of data that is processed and/or communicated using the more secure authentication processes).

With reference to the example of User A requesting an operation that involves execution of a transaction, the application server may determine the security level based on a value of the transaction (e.g., a relatively lower value may be associated with a lower security level and a relatively higher value may be associated with a higher security level), a type of the transaction (e.g., a deposit may be associated with a lower security level and a withdrawal or a payment may be associated with a higher security level), a merchant involved in the transaction (e.g., a recognized merchant may be associated with a lower security level and an unrecognized merchant may be associated with a higher security level), and/or a location associated with the transaction (e.g., a location that is recognized as being associated with User A may be associated with a lower security level and a location that is not recognized as being associated with User A may be associated with a higher security level).

In example implementation 100, the application server may determine, according to the session input and/or a variable of the session input, that User A is to be authenticated prior to performance of a requested operation of the session input. Furthermore, the application server, within the notification, may indicate the security level to indicate a type of authentication process that is to be performed by the authentication system. The application server may provide (e.g., within the notification) one or more parameters of the operation to permit the authentication system to perform a context-based authentication described elsewhere herein.

As further shown in FIG. 1A, and by reference number 115, the authentication system obtains contextual information and account information. For example, the authentication system may obtain the contextual information and/or the account information within the notification. Accordingly, based on receiving the notification, the authentication system may receive a parameter of the operation that indicates context associated with a requirement to authenticate User A. Referring to the example of executing a transaction, the context (or contextual information) may correspond to a value of the transaction, another party involved in the transaction (e.g., a recipient of a transfer of funds and/or a merchant receiving a payment), a location associated with the transaction (e.g., a location of User A and/or User Device 1), and/or a transaction device associated with the transaction (e.g., User Device 1 and/or a transaction card used to initiate the transaction).

Account information may be included within the notification that includes an account identifier of the user account to permit the authentication system to identify one or more addresses of the user devices. For example, the authentication system may include and/or maintain a user information database or other type of data structure that stores device information (e.g., addresses, telephone numbers, and/or device-specific account information that permits access to certain devices, such as home assistant devices) associated with the user devices. Additionally, or alternatively, the account information may include one or more settings or preferences of the user account. For example, the account information may indicate that user preferences for which of the user devices are to be used for authentication in certain situations. As a more specific example, the user preferences may specify that User Device 2 is preferred when a media-based authentication that involves a video response is required and/or that User Device 3 is preferred when a media-based authentication that involves an audio response is required. As another example, the user preferences may specify that User Device 3 is preferred when User A is determined to be at a home location (e.g., which may be determined based on the location of User Device 1, the location of User Device 2, and/or an indicated location in the session input).

Additionally, or alternatively, the user preferences may specify a prioritized order of using the user devices for authentication of the user. The prioritized order may indicate a designated user device (e.g., a preferred user device and/or default user device) that is to be utilized for authentication (e.g., a particular one of the user devices and/or the user device that is engaged in the user session) and/or for a particular type of authentication. More specifically, one user device may be designated for OTP authentication and another user device may be designated for context-based authentication. Furthermore, the prioritized order may indicate an order of the other user devices that are to be utilized in the event that the preferred user device is not capable of performing a required type of authentication process in a certain situation.

Figure 1B:
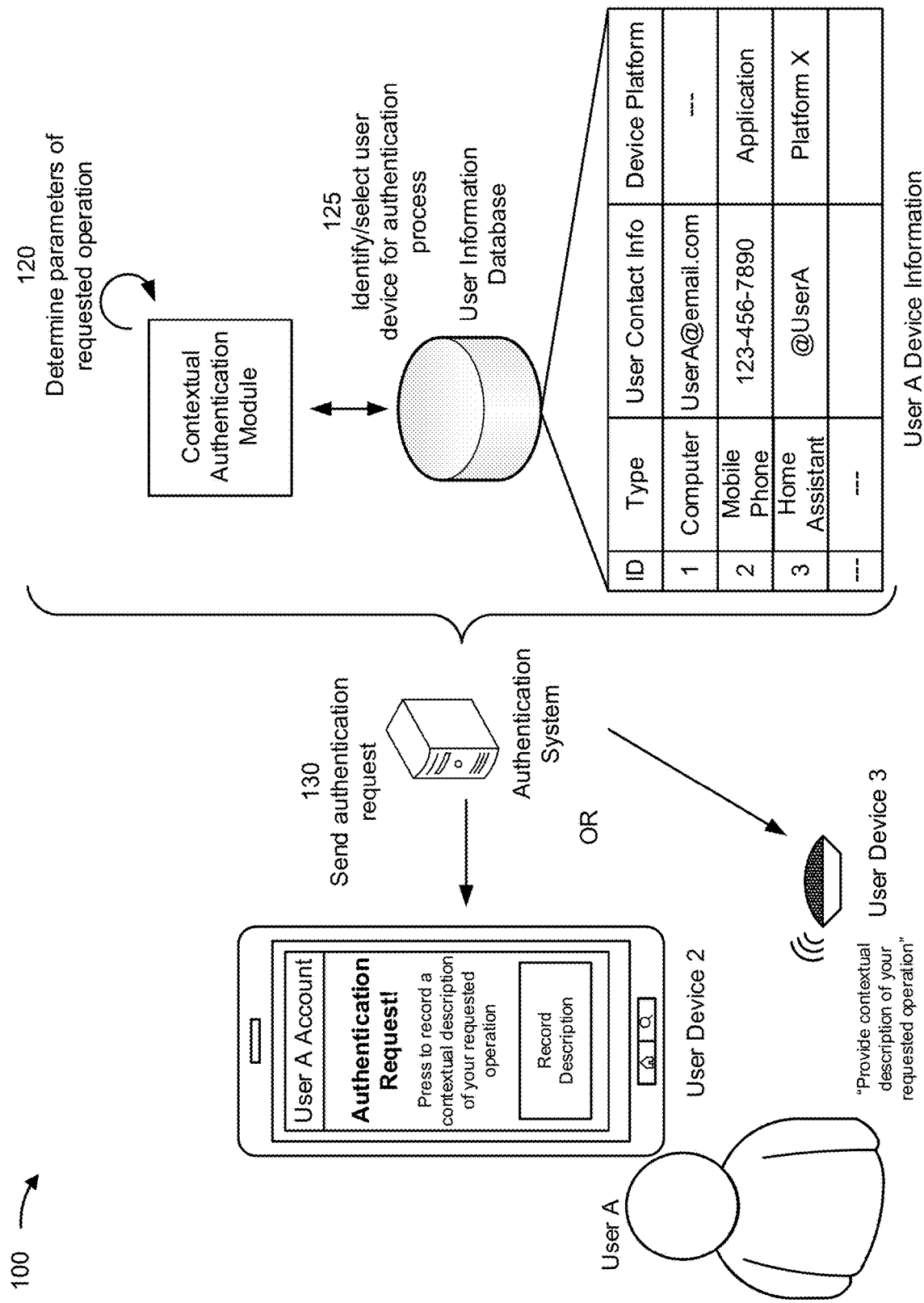

As shown in FIG. 1B, and by reference number 120, the authentication system determines parameters of the requested operation. For example, based on receiving the notification from the application server, a contextual authentication module of the authentication system may process the notification (and/or contextual information within the notification) to identify one or more parameters of the requested operation. The contextual authentication module may determine, based on the notification, that a particular type of authentication process (e.g., a particular type of factor that is to be used for MFA) is to be performed to authenticate User A based on the one or more parameters. For example, from an indicated security level, the contextual authentication module may determine that a context-based authentication is to be performed involving the one or more parameters of the requested operation. Accordingly, based on the indicated security level, the authentication system may process the notification to identify the one or more parameters.

As further shown in FIG. 1B, and by reference number 125, the authentication system identifies and/or selects a user device for the authentication process. For example, the authentication system may select a user device (shown as User Device 2 or User Device 3) from the user devices associated with User A based on the settings of the user account. Additionally, or alternatively, the authentication system may select the user device based on the type of authentication process that is to be performed (e.g., based on the which factors the authentication system is to utilize to authenticate User A). Accordingly, the authentication system may identify a type of a particular user device that has a user interface that is capable of performing the type of authentication process (e.g., a camera to provide video and/or a microphone to provide audio).

As shown in the user information database, the authentication system maintains user contact information and/or device account information associated with the user devices of User A. For example, the user information database indicates that User Device 1 is a computer and the authentication system may use an email address to authenticate User A via User Device 1. The user information database indicates that User Device 2 is a mobile phone and the authentication system may use a telephone number to authenticate User A via User Device 2 and/or to authenticate User A via the user account of the application. The user information database indicates that User Device 3 is a home assistant device and that the authentication system may use an account identifier (@UserA) of an account associated with a platform of User Device 3 (Platform X). User Device 3, as a home assistant device, may be preconfigured with a home assistant skill that permits User Device 3 to operate in association with the authentication system. For example, User A may be logged into a device account associated with User Device 3 (e.g., a home assistant account platform), and an authentication service skill (e.g., a home assistant application programming interface (API)) associated with the authentication system and/or the application may be enabled and/or activated via the account associated with the platform of User Device 3.

In example implementation 100, the authentication system may determine that the authentication system is to perform a context-based authentication (e.g., based on the security level and/or an indication from the application server). Accordingly, the authentication system may identify which of the user devices are to be used to provide a contextual description (e.g., rather than an OTP) of an operation to the authentication system (e.g., based on settings of the account and/or capabilities of the user devices). The contextual description may correspond to the context for the requirement for the authentication response described elsewhere herein.

Settings of the user account may indicate that User A may indicate that User Device 2 or User Device 3 is preferred over User Device 1 to provide a contextual description. Accordingly, as shown in FIG. 1B, the authentication system may select User Device 2 and/or User Device 3 to provide a contextual description of the operation. In some implementations, the authentication system may select User Device 2 or User Device 3 based on whether the contextual description is to be provided within a video response or within an audio response. For example, a relatively higher security level may require both audio and video of the user providing the contextual description and a relatively lower security level may only require audio of the user providing the contextual description. Accordingly, in example implementation 100, if the operation involves a security level that requires video of User A providing the response, the authentication system may select User Device 2 over User Device 3 because User Device 2 is a mobile phone with an integrated camera that can capture the video and User Device 3 is a home assistant device that does not include a camera. On the other hand, if User A prefers that User Device 3 be used to provide a contextual description via audio (without needing video), the authentication system may select User Device 3 over User Device 2, though both User Device 3 and User Device 2 can be used to provide an audio response.

As further shown in FIG. 1B, and by reference number 130, the authentication system sends an authentication request. The authentication request may prompt the user device to provide a contextual description of the operation. For example, via User Device 2, the authentication request may prompt the application to present a message (e.g., via a display) to request User A to record a contextual description of the requested operation (e.g., a contextual description that describes one or more parameters of the operation). Additionally, or alternatively, via User device 3, the authentication request may prompt User Device 3 to audibly request User A to provide the contextual description of the requested operation.

In some implementations, the authentication request may request that User A provide a contextual description that specifically describes a particular parameter of the operation and/or a set of parameters of the operation. For example, referring to the example associated with a transaction, the authentication request may request User A to provide a value of the transaction, identify another party involved in the transaction, indicate a location associated with User A initiating the transaction, indicate which user device User A used to request the operation, and/or indicate which transaction device User A used in the transaction.

Figure 1C:
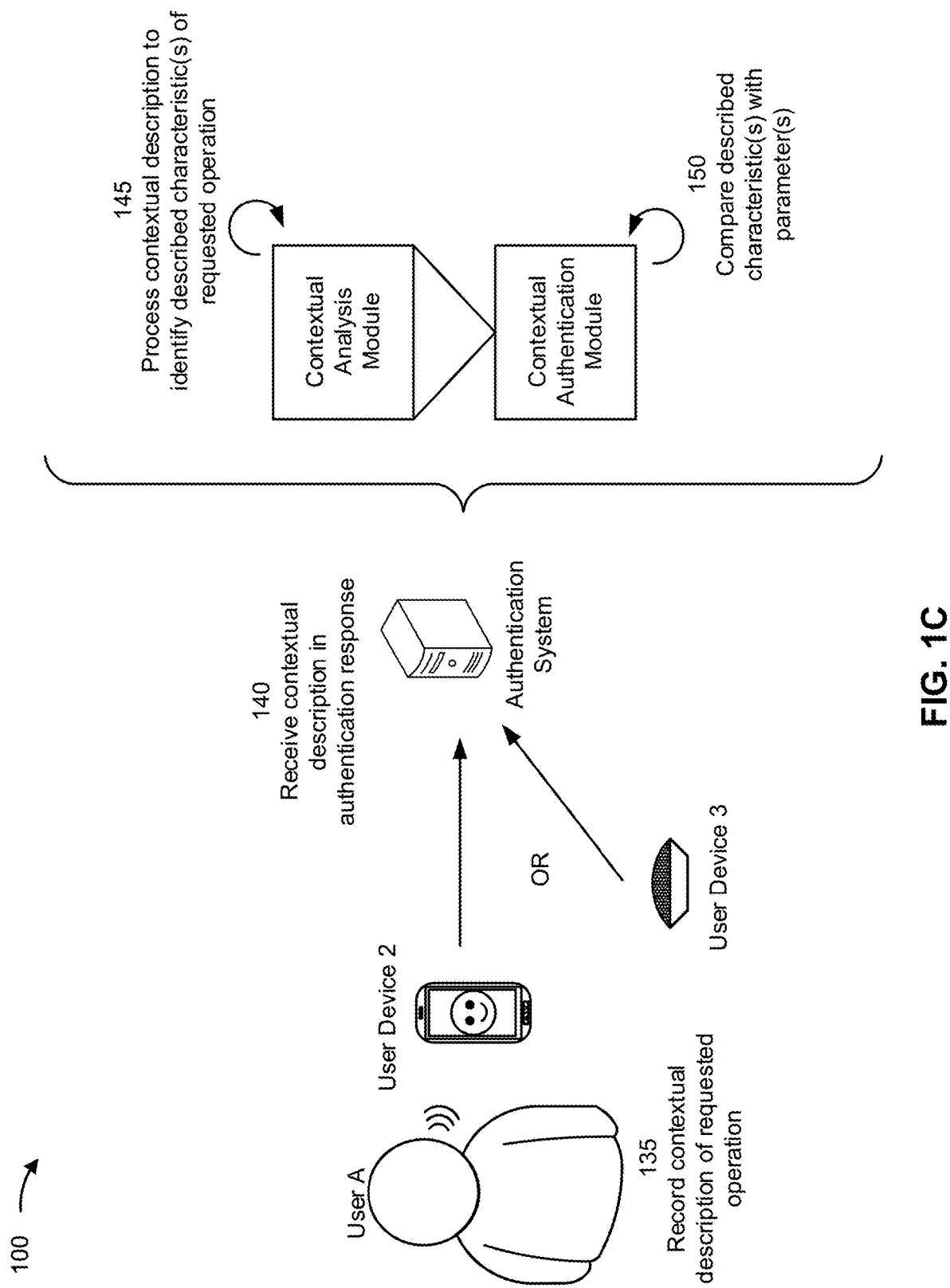

As shown in FIG. 1C, and by reference number 135, the user, using the user device, records a contextual description of the requested operation. For example, via User Device 2, User A may record a video that depicts User A's face while User A speaks the contextual description. In some implementations, User A may provide a text-based contextual description of the operation (e.g., using a text message and/or a user input to a field of the application). Additionally, or alternatively, via User Device 3, User A may speak the contextual description (e.g., in response to the request from User Device 3 for the contextual description) to permit the User Device 3 to record the contextual description. For example, a home assistant skill of User Device 3 may be configured to listen (e.g., activate a microphone) for speech from User Device 3 that can be recorded as an audio-based contextual description.

Accordingly, User Device 2 may obtain a video-based contextual description from User A, and/or User Device 3 may obtain an audio-based contextual description from User A. The video-based contextual description and/or the audio-based contextual description may be used to authenticate User A (e.g., via a context-based authentication and/or a media-based authentication).

As further shown in FIG. 1C, and by reference number 140, the authentication system receives the contextual description within an authentication response. For example, the authentication response and/or contextual description may include text data, audio data, and/or video data that is associated with one or more described characteristics of the operation from User A.

The contextual description may be received as unstructured data that may describe or identify the one or more parameters, and the one or more parameters may be received as structured data that specifies the parameters. Accordingly, the one or more described characteristics in the authentication response may or may not match the one or more parameters of the operation because a user that provides the authentication response may provide the contextual description using natural language (which indicates whether the authentication response is valid and/or whether or not User A is an authorized user of the user account).

As further shown in FIG. 1C, and by reference number 145, the authentication system processes the contextual description to identify the one or more described characteristics of the requested operation. For example, the authentication system, via the contextual analysis module, may process speech data from audio data of the authentication response using a speech processing technique (e.g., speech-to-text technique) and/or a natural language processing technique. Accordingly, the contextual analysis module may identify the contextual description from the speech and/or one or more described characteristics of the operation based on the type of the operation and/or the parameters of the operation. Referring to the example involving a transaction, the contextual analysis module may process the speech to identify words or phrases spoken by User A to describe the transaction (e.g., "payment," "transfer," "in the amount of" "to Merchant B," "using a transaction card," and so on).

As further shown in FIG. 1C, and by reference number 150, the authentication system compares the one or more characteristics with the one or more parameters of the operation. For example, the authentication system, via the contextual authentication module, may compare the one or more characteristics with the one or more identified parameters using a similarity analysis model (e.g., a clustering model and/or a cosine similarity model). Using the similarity analysis, the contextual authentication module may determine a similarity score between a described characteristic and an indicated parameter of the operation. The authentication system may use the similarity score to determine whether a described characteristic is associated with a particular parameter. For example, referring to the example involving a transaction, the authentication response may include a contextual description of the operation that is determined to be "a $100 purchase from Merchant B" and the notification may indicate parameters of the operation to be "Value: −$100.80" and "Merchant: B65484." In this example, using the similarity analysis and/or natural language processing, the authentication system may determine that a described characteristic of "$100 Purchase" is associated with the a first parameter (a value of −$100.80) and/or that the described characteristic of "Merchant B" is associated with a second parameter (a merchant identified by B65484).

In example implementation 100, the one or more described characteristics are independently provided by User A. For example, because User A is engaged in the user session and/or requested the operation, User A has independently obtained knowledge of the context for the authentication request. Accordingly, when a described characteristic corresponds to and/or is associated with (e.g., match or appear to match) parameter(s) of the operation, the authentication system may infer that the authentication response is valid (was provided by an authorized user, such as User A). In contrast, when a described characteristic does not indicate an association with a corresponding parameter, the authentication system may infer that the response is not valid (e.g., was not provided by User A or an authorized user) because the user that provided the described characteristic should have known the parameter(s) of the operation.

Figure 1D:
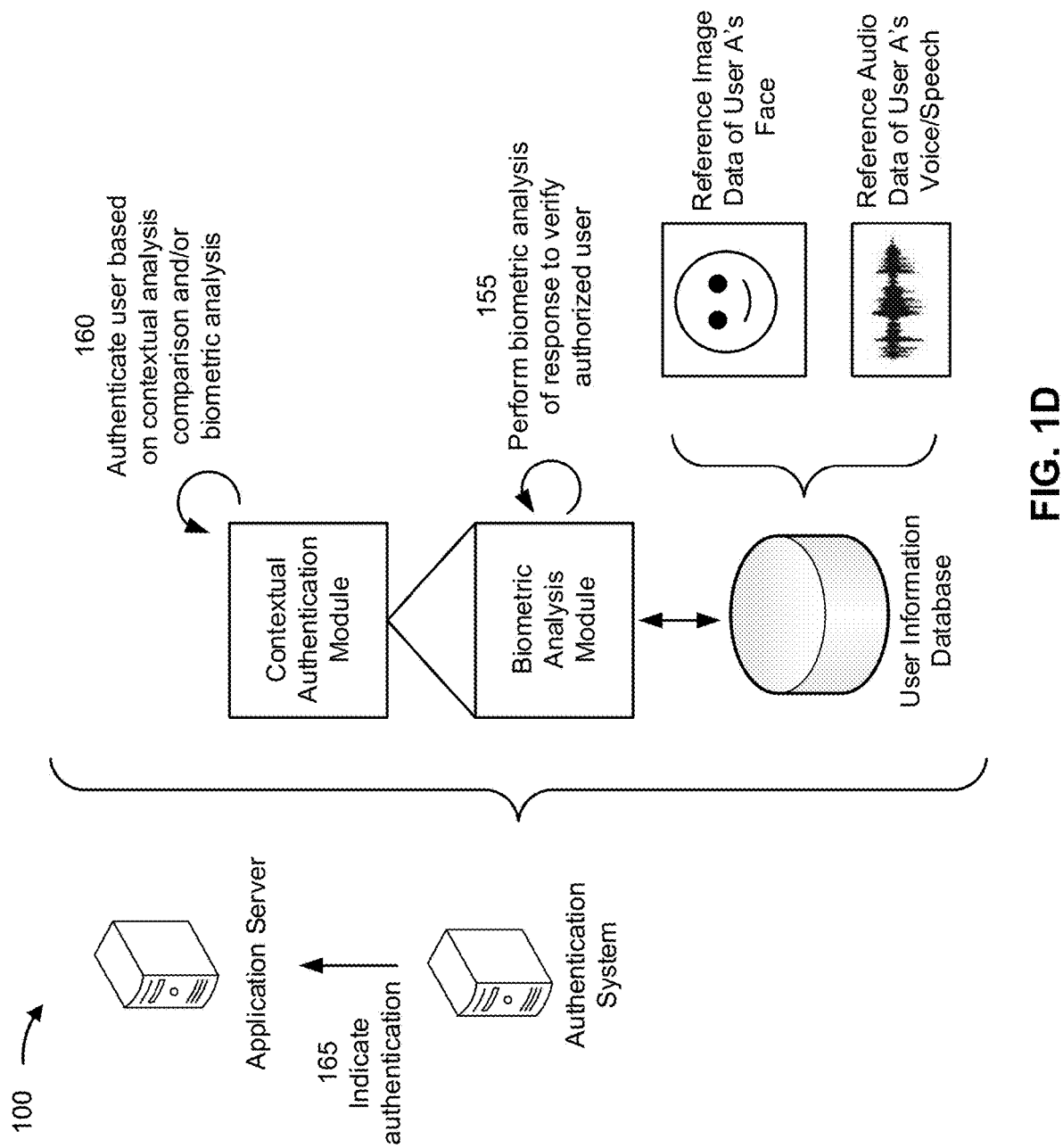

As shown in FIG. 1D, and by reference number 155, the authentication system performs a biometric analysis of the authentication response to verify that an authorized user provided the authentication response. For example, the authentication system, via a biometric analysis module, may perform the biometric analysis based on the security level indicating that a media-based authentication of the user is to be performed. The biometric analysis module may analyze media content (e.g., audio content, image content, and/or video content) associated with video data and/or audio data of the authentication response based on a corresponding reference signature associated with one or more features associated with an authorized user of the user account. The one or more features may include an appearance (e.g., a facial appearance or other distinguishing feature) of the authorized user and/or a sound (e.g., a voice) associated with the authorized user. For example, video data may include video content that depicts a face of User A and/or audio data may include audio content that includes speech from User A.

The biometric analysis module may include and/or be associated with a media-based biometric analysis model, such as a facial recognition model and/or a voice recognition model. The facial recognition model and/or the voice recognition model may utilize and/or may be trained based on the reference signatures in the user information database. For example, as shown, the user information database may include reference image data (e.g., one or more video frames of previously obtained video data) corresponding to a facial reference signature associated with User A's face. The biometric analysis module may process video data of the authentication response using the facial recognition model and the facial reference signature to determine whether User A is an authorized user. Additionally, or alternatively, the user information database may include reference audio data (e.g., previously obtained audio) of User A's voice (and/or speech) corresponding to a voice reference signature. The biometric analysis module may process audio data of the authentication response using the voice recognition model and the voice reference signature to permit the biometric analysis module to determine whether User A is an authorized user.

Accordingly, the biometric analysis model may determine whether media content received in the authentication response includes a feature and/or is associated with a feature of an authorized user. If the feature is determined to be associated with a face of an authorized user and/or a voice of an authorized user (and/or speech by the authorized user), the authentication system may verify that the authentication response is associated with the user and/or determine that the authentication response is valid.

As further shown in FIG. 1D, and by reference number 160, the authentication system authenticates the user based on the contextual analysis comparison and/or the biometric analysis. For example, the authentication system, via the contextual authentication module may authenticate the user based on a comparison between the described characteristics and one or more corresponding parameters.

In some implementations, the authentication system may determine a context-based authentication score based on a quantity of described characteristics that are determined to be associated with indicated parameters of the operation. For example, a larger quantity of described characteristics that are determined to be similar to and/or associated with indicated parameters, may provide a context-based authentication score that indicates that the authentication response is valid according to a context-based authentication process. Additionally, or alternatively, the authentication system may determine a media-based authentication score based on a biometric analysis of video data and/or audio data within the authentication response. For example, the media-based authentication score may be determined using facial recognition techniques, voice recognition techniques, and/or speech recognition techniques, as described elsewhere herein.

The authentication system may authenticate User A based on the context-based authentication score and/or the media-based authentication score. For example, the authentication system may use a weighted average of the context-based authentication score and/or the media-based authentication score. In such an example, different weights may be assigned to the context-based authentication score and/or the media-based authentication score according to settings of the user account, the security level, and/or one or more of the parameters of the operation. Additionally, or alternatively, the authentication system may compare an authentication score (e.g., the context-based authentication score, the media-based authentication score, and/or a weighted average of the context-based authentication score and the media-based authentication score) to one or more authentication threshold scores associated with validating an authentication response. For example, an authentication score that satisfies the one or more authentication threshold scores may indicate that the contextual description was likely provided by an authenticated user of the user account (e.g., based on a context-based authentication score indicating that the described characteristic satisfies a threshold score that is indicative of an authorized user accurately describing a context of requesting the performance of the operation). Additionally, or alternatively, an authentication score that satisfies the one or more authentication threshold scores may indicate that media content was associated with or included a feature of an authorized user of the user account. Accordingly, the authentication system may utilize one or more authentication scores and/or one or more authentication threshold scores to authenticate User A.

As further shown in FIG. 1D, and by reference number 165, the authentication system indicates authentication of the user to the application server. For example, the authentication system may provide a notice of authentication to the application server. The authentication system may cause or permit the application server to perform the operation according to the one or more parameters. Referring to the example involving the transaction, the authentication system may indicate that the user has been authenticated to permit the application server to execute the transaction.

In some implementations, if the authentication system determines that an authentication response is invalid (e.g., the described characteristics are not associated with the one or more parameters and/or the authentication response does not include media content associated with an authorized user), the authentication system may indicate that the user has not been authenticated and/or prevent the application server from performing of the operation (e.g., to prevent potential fraud associated with the requested operation).

Accordingly, the service provider system described herein can improve accuracy with respect to authenticating a user by using one or more complex factors (e.g., as a part of an MFA process) to authenticate an authentication response of a user and reducing opportunities for fraudulent interception of authentication information. As described herein, a type of authentication process may be selected based on a type of operation that is requested. The utilized factors may involve information that can be independently determined by an authorized user (e.g., because the authorized user submitted the request for the operation). For example, the service provider system, as described herein, is configured to compare a contextual description in the authentication response to one or more parameters of the requested operation (e.g., by identifying and mapping one or more described characteristics of the operation to the one or more parameters). Accordingly, the service provider system would not have to indicate within an authentication request, information that is to be provided as an authentication response. The authorized user would be able to independently provide the authentication response, thereby reducing a likelihood that malware or a malicious actor be authenticated via an authentication response to the authentication request.

Moreover, the authentication response may be validated using media content associated with the user to verify that the authentication response was provided by an authorized user, further improving the accuracy of authenticating the user. Therefore, service provider system, as described herein, may conserve computing resources (e.g., processing resources, memory resources, and/or power resources) and/or network resources involved in correcting any fraudulent activity that would have been allowed without the use of the system as described herein.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
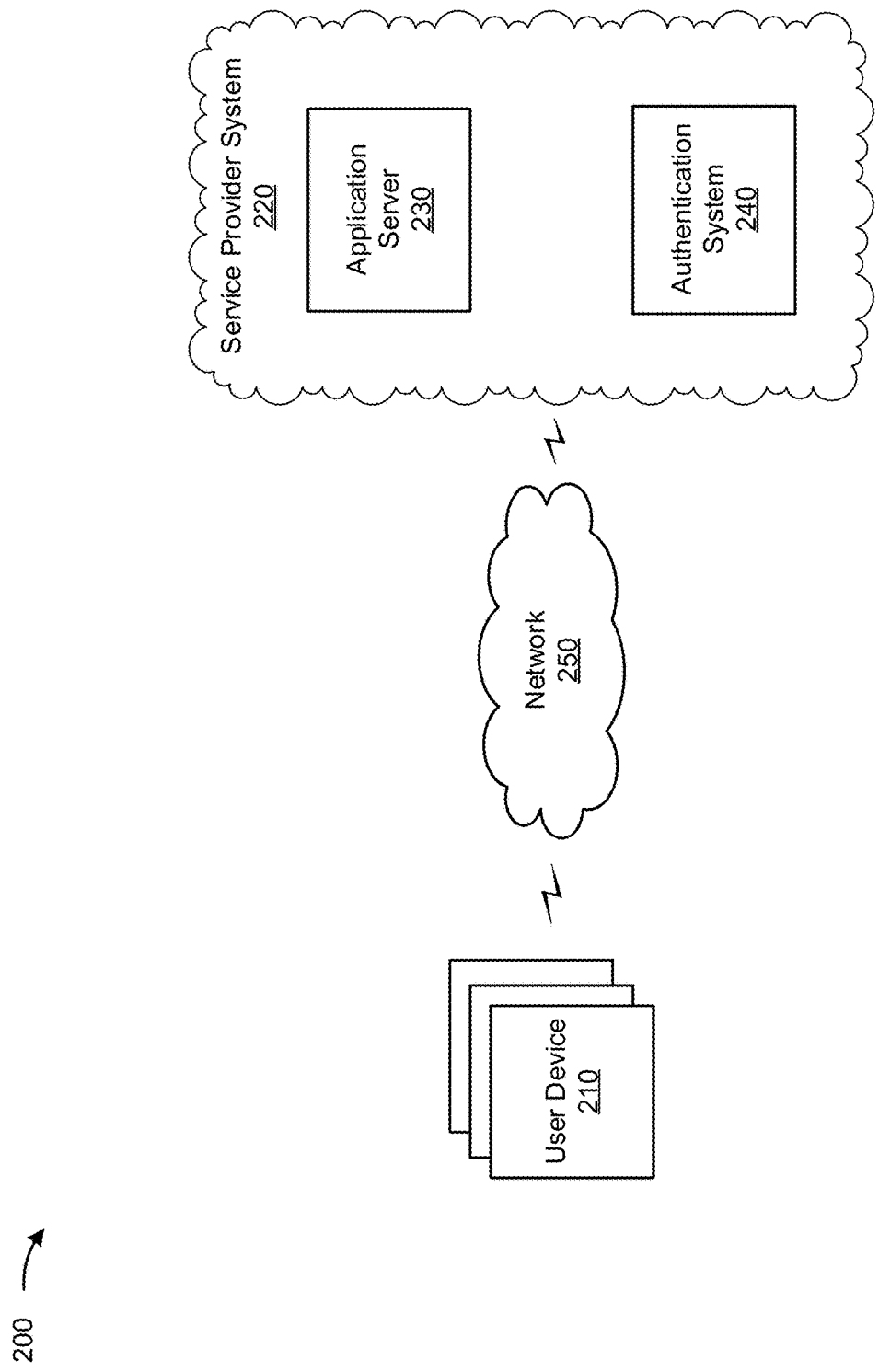
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210, a service provider system 220 that includes an application server 230 and an authentication system 240, and a network 250. Devices of environment 200 may interconnect via wired connections, wireless connections, or a combination of wired and wireless connections.

The user device 210 includes one or more devices capable of receiving, generating, storing, processing, and/or providing information associated with enabling context-based authentication of a user, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The application server 230 includes one or more devices capable of receiving, generating, storing, processing, providing, and/or routing information associated with providing a service and/or performing an operation associated with an application, as described elsewhere herein. The application server 230 may include a communication device and/or a computing device. For example, the application server 230 may include a server, such as a web server, a database server, a host server, a proxy server, a virtual server (e.g., executing on computing hardware), or a server in a cloud computing system. In some implementations, the application server 230 includes computing hardware used in a cloud computing environment.

The authentication system 240 includes one or more devices capable of receiving, generating, storing, processing, providing, and/or routing information associated with authenticating a user (e.g., using an MFA technique), as described elsewhere herein. The authentication system 240 may include a communication device and/or a computing device. For example, the authentication system 240 may include a server, such as an application server, a client server, a web server, a database server, a host server, a proxy server, a virtual server (e.g., executing on computing hardware), or a server in a cloud computing system. In some implementations, the authentication system 240 includes computing hardware used in a cloud computing environment.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
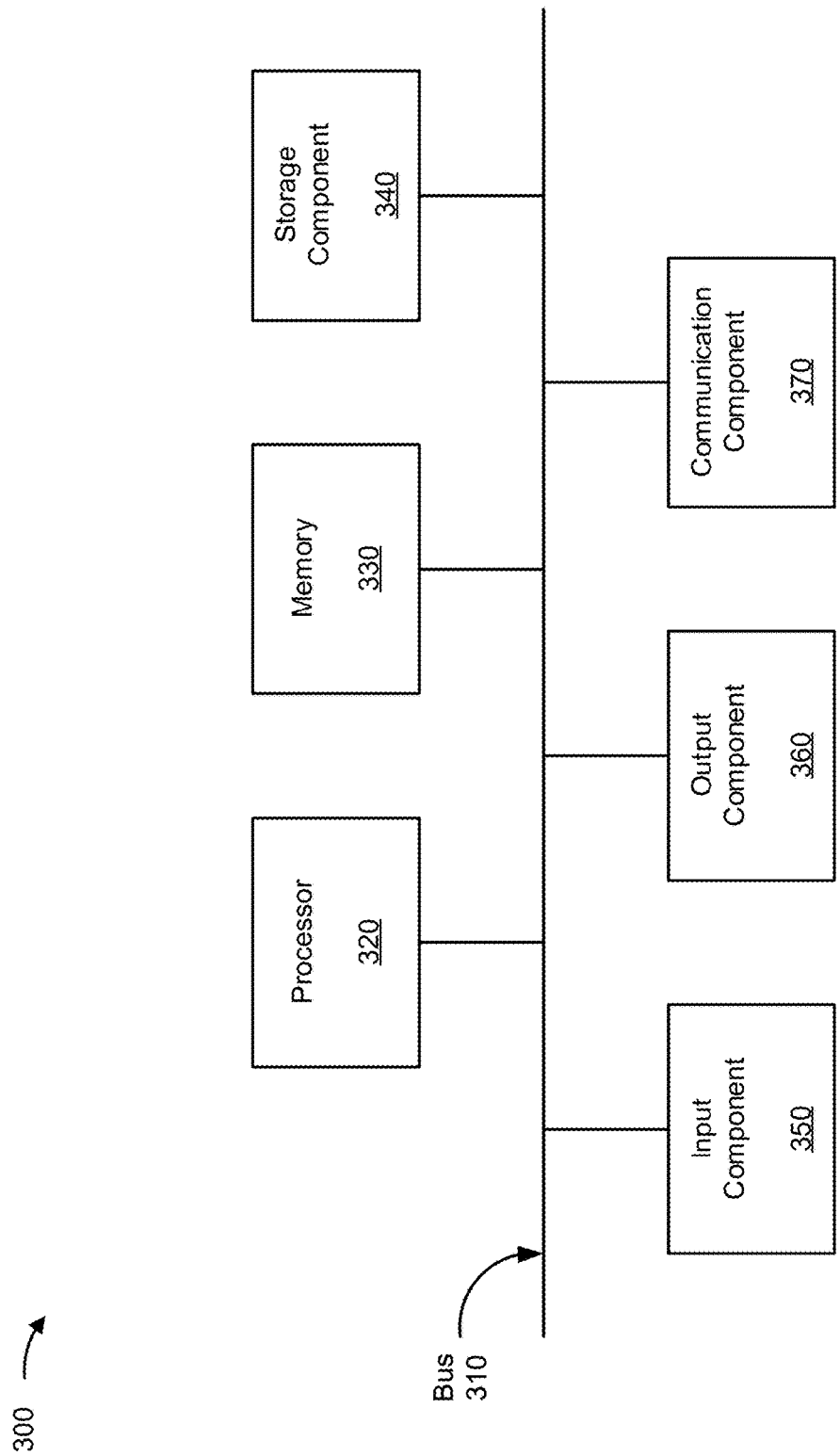
FIG. 3 is a diagram of example components of one or more devices of FIG. 2.

FIG. 3 is a diagram of example components of a device 300, which may correspond to the user device 210, the service provider system 220, the application server 230, and/or the authentication system 240. In some implementations, the user device 210, the service provider system 220, the application server 230, and/or the authentication system 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
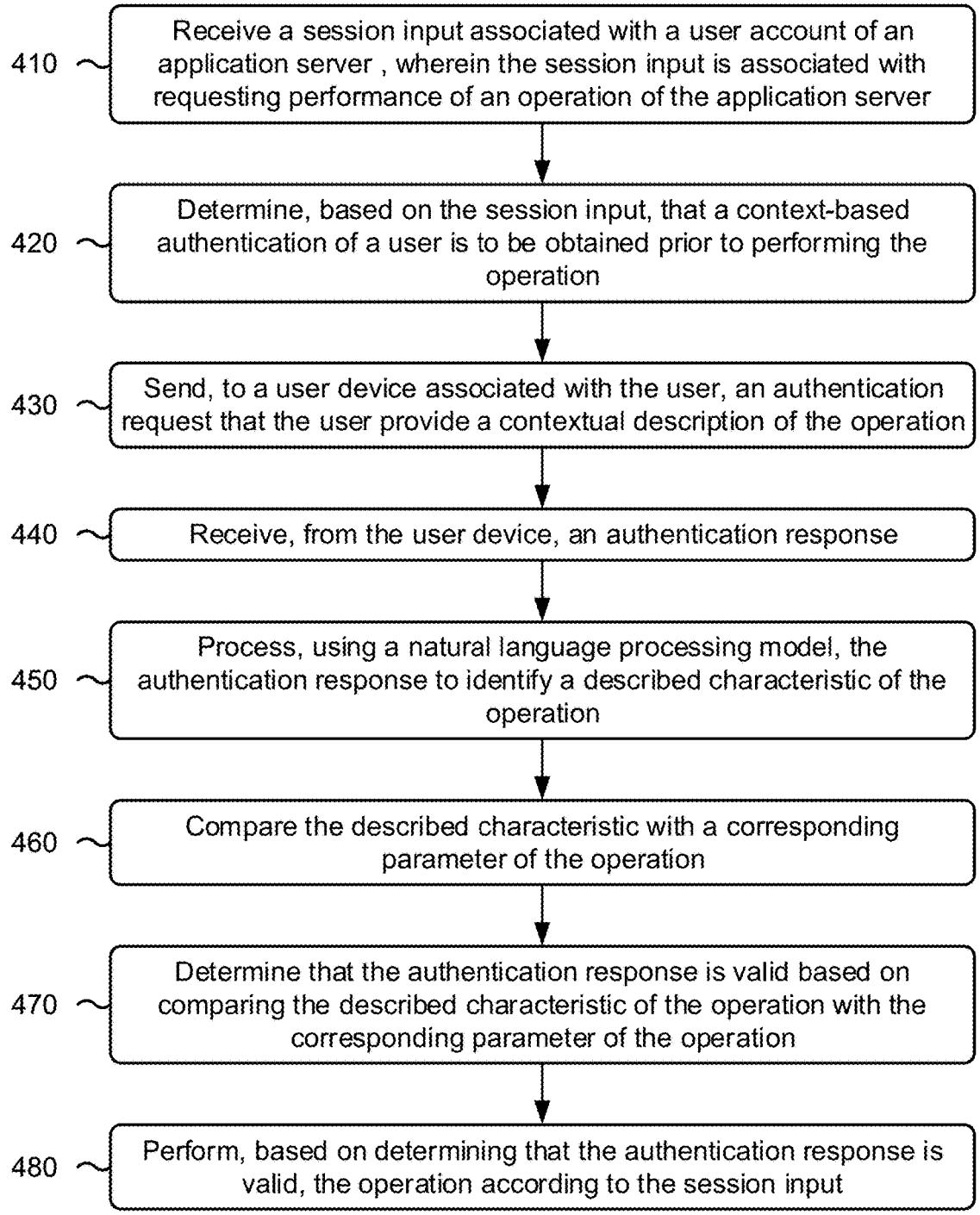
FIG. 4 is a flowchart of an example process relating to context-based authentication of a user.

FIG. 4 is a flowchart of an example process 400 associated with context-based authentication of a user. In some implementations, one or more process blocks of FIG. 4 may be performed by a service provider system (e.g., service provider system 220). In some implementations, one or more process blocks of FIG. 4 may be performed by another device or a group of devices separate from or including the service provider system, such as the user device 210, the application server 230 and/or the authentication system 240. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a session input associated with a user account of an application server (block 410). In some implementations, the session input is associated with requesting performance of an operation of the application server. As further shown in FIG. 4, process 400 may include determining, based on the session input, that a context-based authentication of a user is to be obtained prior to performing the operation (block 420). As further shown in FIG. 4, process 400 may include sending, to a user device associated with the user, an authentication request that the user provide a contextual description of the operation (block 430).

As further shown in FIG. 4, process 400 may include receiving, from the user device, an authentication response (block 440). As further shown in FIG. 4, process 400 may include processing, using a natural language processing model, the authentication response to identify a described characteristic of the operation (block 450). As further shown in FIG. 4, process 400 may include comparing the described characteristic with a corresponding parameter of the operation (block 460).

As further shown in FIG. 4, process 400 may include determining that the authentication response is valid based on comparing the described characteristic of the operation with the corresponding parameter of the operation (block 470). As further shown in FIG. 4, process 400 may include performing, based on determining that the authentication response is valid, the operation according to the session input (block 480).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authentication, the system comprising:
one or more memories; and
one or more processors, coupled to the one or more memories, configured to:
send, to a user device, an authentication request that a user, associated with the user device, provide a contextual description that describes a plurality of parameters of an operation of an application server;
receive, from the user device, an authentication response that includes the contextual description;
determine an authentication score based on comparing one or more described characteristics, within the contextual description, and the plurality of parameters; and
cause, based on the authentication score satisfying a threshold, the operation to be performed.

2. The system of claim 1, wherein the one or more processors are further configured to:
receive a notification to authenticate the user,
wherein the notification includes the plurality of parameters.

3. The system of claim 1, wherein the one or more processors are further configured to:
select the user device from a plurality of user devices associated with the user based on settings of a user account associated with the user.

4. The system of claim 1, wherein the one or more processors, when sending the authentication request to the user device, are configured to:
cause the user device to display a message that requests the user to record the contextual description.

5. The system of claim 1, wherein the one or more processors, when sending the authentication request to the user device, are configured to:
cause the user device to audibly request that the user provide the contextual description.

6. The system of claim 1, wherein the contextual description is one of:
a video-based contextual description,
an audio-based contextual description, or
a text-based contextual description.

7. The system of claim 1, wherein the one or more processors are further configured to:
perform a biometric analysis of the authentication response to verify that an authorized user provided the authentication response; and
wherein the one or more processors, when determining the authentication score, are configured to determine the authentication score based further on the biometric analysis.

8. The system of claim 7, wherein the one or more processors, when performing the biometric analysis, are configured to:
analyze media content of the authentication response based on corresponding reference signatures associated with one or more features associated with the authorized user,
wherein the media content is at least one of audio content, image content, or video content, and
wherein the one or more features include at least one of an appearance of the authorized user or a sound associated with the authorized user.

9. The system of claim 1, wherein the operation comprises execution of a transaction, and
wherein the plurality of parameters indicate at least one of:
a value of the transaction;
a merchant associated with the transaction;
a type of the transaction; or
a transaction device associated with the transaction.

10. A method, comprising:
sending, by a device, to a user device, an authentication request that a user, associated with the user device, provide a contextual description that describes a plurality of parameters of a transaction associated with a user account of the user;
receiving, from the user device, an authentication response that includes the contextual description;
determining, by the device, an authentication score based on comparing a plurality of described characteristics, within the contextual description, and the plurality of parameters; and
causing, by the device and based on the authentication score satisfying a threshold, the transaction to be performed.

11. The method of claim 10, wherein the contextual description is a video-based contextual description.

12. The method of claim 10, further comprising:
performing a biometric analysis of the authentication response to verify that an authorized user provided the authentication response; and
wherein determining the authentication score comprises determining the authentication score based on the biometric analysis.

13. The method of claim 12, wherein performing the biometric analysis comprises:
analyzing media content of the authentication response based on corresponding reference signatures associated with one or more features associated with the authorized user,
wherein the media content is at least one of audio content, image content, or video content, and
wherein the one or more features include at least one of an appearance of the authorized user or a sound associated with the authorized user.

14. The method of claim 10, wherein the authentication score satisfying the threshold is indicative of an authorized user accurately describing, in the contextual description, a context of requesting performance of the transaction.

15. A non-transitory computer-readable medium storing a set of instructions, the set of instructions comprising:
one or more instructions that, when executed by one or more processors of a device, cause the device to:
send, to a user device, an authentication request that a user, associated with the user device, provide a contextual description that describes a plurality of parameters of an operation of an application server;
receive, from the user device, an authentication response that includes the contextual description,
wherein the contextual description is one of a text-based contextual description, an audio-based textual description, or a video-based audio description;
determine an authentication score based on comparing one or more described characteristics, within the contextual description, and the plurality of parameters; and
cause, based on the authentication score satisfying a threshold, the operation to be performed.

16. The non-transitory computer-readable medium of claim 15, wherein the one or more instructions further cause the device to:
  select the user device from a plurality of user devices associated with the user based on settings of a user account associated with the user.

17. The non-transitory computer-readable medium of claim 15, wherein the one or more instructions further cause the device to at least one of:
  display a message that requests the user to record the contextual description, or
  audibly request that the user provide the contextual description.

18. The non-transitory computer-readable medium of claim 15, wherein the one or more instructions further cause the device to:
  perform a biometric analysis of the authentication response to verify that an authorized user provided the authentication response; and
  wherein the one or more instructions, that cause the device to determine the authentication score, cause the device to determine the authentication score based further on the biometric analysis.

19. The non-transitory computer-readable medium of claim 18, wherein the one or more instructions, that cause the device to perform the biometric analysis, cause the device to:
  analyze media content of the authentication response based on corresponding reference signatures associated with one or more features associated with the authorized user,
    wherein the media content is at least one of audio content, image content, or video content, and
    wherein the one or more features include at least one of an appearance of the authorized user or a sound associated with the authorized user.

20. The non-transitory computer-readable medium of claim 15, wherein the operation comprises execution of a transaction, and
  wherein the plurality of parameters indicate at least one of:
    a value of the transaction;
    a merchant associated with the transaction;
    a type of the transaction; or
    a transaction device associated with the transaction.

* * * * *